United States Patent
Kamp et al.

(10) Patent No.: US 6,286,536 B1
(45) Date of Patent: Sep. 11, 2001

(54) SAFETY DEVICE FOR A VESSEL UNDER GAS PRESSURE

(75) Inventors: Franz Kamp, Schwerte; Konstantin Röttger, Arnsberg, both of (DE)

(73) Assignee: VTI Ventil TechnikGmbH, Menden (DE)

(*) Notice: Subject to any disclaimer, the term of this patent is extended or adjusted under 35 U.S.C. 154(b) by 0 days.

(21) Appl. No.: 09/526,899

(22) Filed: Mar. 16, 2000

(30) Foreign Application Priority Data

Mar. 16, 1999 (DE) .............................................. 199 11 530

(51) Int. Cl.$^7$ ..................................................... F16K 17/38
(52) U.S. Cl. ............................ 137/68.13; 137/72; 137/79
(58) Field of Search .................... 137/68.13, 72, 137/79

(56) References Cited

U.S. PATENT DOCUMENTS

| | | | |
|---|---|---|---|
| 3,744,816 | * | 7/1973 | Yamaguchi et al. ............ 1137/68.13 |
| 4,077,423 | * | 3/1978 | Kasagi et al. .................. 137/68.13 |
| 5,511,576 | * | 4/1996 | Borland ............................. 137/72 |

FOREIGN PATENT DOCUMENTS

| | | |
|---|---|---|
| 671 278 A5 | 8/1989 | (CH) . |
| OS 28 13 219 | 9/1979 | (DE) . |
| 38 19 749 C2 | 12/1989 | (DE) . |
| 297 17 707 U1 | 1/1998 | (DE) . |
| 000772673 * | 4/1957 | (GB) ................................. 137/68.13 |

* cited by examiner

Primary Examiner—Michael Powell Buiz
Assistant Examiner—Ramesh Krishnamurthy
(74) Attorney, Agent, or Firm—Henry M. Feiereisen

(57) ABSTRACT

A safety device for an apparatus under pressure, such as a vessel under gas pressure, includes a housing having an overflow channel in fluid communication with the interior of the apparatus, and an outlet port. Received in the housing is a thermal trigger unit which has a rupture element intended to burst when a critical temperature level is exceeded. The rupture element interacts with a closure member which is moveable from a ready position, in which the closure member is so loaded by the rupture element as to seal the overflow channel and thereby cut a fluid communication between the overflow channel and the outlet port, to a release position, in which the overflow channel is cleared for fluid communication with the outlet port as a result of a bursting of the rupture element.

8 Claims, 4 Drawing Sheets

SAFETY DEVICE FOR A VESSEL UNDER GAS PRESSURE

CROSS-REFERENCES TO RELATED APPLICATIONS

This application claims the priority of German Patent Application Serial No. 199 11 530.3, filed Mar. 16, 1999, the subject matter of which is incorporated herein by reference.

BACKGROUND OF THE INVENTION

The present invention relates to a safety device for an apparatus under gas or vapor pressure such as a vessel, in particular for use in road vehicles.

Regulations require that vessels under gas pressure should safely withstand expected loads during operation. Moreover, safety devices, such as flow rate limiters and safety devices to protect against excess pressure are required in case of fire. According to technical standards for pressure gases TRG 381, vessels under gas pressure should be equipped with a fuse-type safety device or equivalent safety device to prevent excess pressure in case of fire and thereby protect against rupturing of the vessel. Larger vessels require application of several such trigger units, to ensure a sufficient pressure relief.

The use of fuse-type safety devices suffers, however, shortcomings because the employed solders are fairly expensive and progressively deform plastically over time when subject to a continuous load. Thus, so-called creeping, leads to an alteration of the response characteristic of the safety device, so that the condition of the fuse-type safety device cannot be assessed from outside.

SUMMARY OF THE INVENTION

It is thus an object of the present invention to provide an improved safety device for an apparatus under pressure, obviating the afore-stated drawbacks.

In particular, it is an object of the present invention to provide an improved safety device for a vessel under gas pressure, which has an improved response characteristic and yet has a compact configuration.

These objects, and others which will become apparent hereinafter, are attained in accordance with one aspect of the present invention by providing a thermal trigger unit which includes a rupture element, and a closure member moveable from a ready position, in which the closure member is so acted upon by the rupture element that a guide shaft of the closure member projects into and seals an overflow channel from an outlet port of the housing, to a release position, in which the overflow channel is cleared for fluid communication with the outlet port.

The rupture element exhibits a rapid response characteristic when exposed to heat and is not subject to any plastic deformations. Therefore the closure member is securely held in place, and creeping, as encountered with solders, is eliminated. The response characteristic of the safety device thus remains substantially constant over time.

Suitably, the closure member is sealed about its circumference with respect to the overflow channel, for example, by sealing elements in the form of O-rings.

According to another feature of the present invention, the closure member includes a support plate which is wider than the guide shaft, so that the closure member has a substantially T-shaped configuration, thereby axially securing the closure member in place. The support plate is pressed in tight contact against a housing area that surrounds the overflow channel, so that the overflow channel is fluidly sealed in conjunction with incorporation of a sealing element. Certainly, the sealing element may also be disposed in a transition zone between the guide shaft and the support plate. The sealing element may be supported in the housing as well as in the closure member.

When exposed to heat, the rupture element bursts and the closure member is displaced from the overflow channel, as a consequence of the interior pressure in the vessel, acting against the proximal end face of the guide shaft. Thus, gas can escape the vessel through the overflow channel and the cleared outlet port.

According to another feature of the present invention, the closure member may interact with the rupture element and at least one restraining member, so that the pressure force, generated by the interior pressure in the vessel and applied against the end face of the closure member, will not act solely on the rupture element but is also transmitted onto at least one restraining element. Suitably, the rupture element and the restraining element are fixed in place on a shaft-distal side by an abutment plate. Advantageously, one rupture element and two restraining elements are provided and placed in a circular arrangement at an angular distance of 120°. In this manner, when the rupture element bursts upon exposure to heat, only the restraining elements remain to interact with the closure member. The closure member can be pushed out of the overflow channel by the inner vessel pressure which is applied in the overflow channel, thereby establishing a fluid communication to the outlet port. A reduction of the force applied on the rupture element enables the use of smaller rupture elements that are quicker to respond.

Suitably, the abutment plate is so supported in the housing as to permit a tilting movement thereof so that the restraining elements, positioned between the abutment plate and the closure member, allow a jam-free displacement of the guide shaft from the overflow channel.

According to another feature of the present invention, the housing has an open top which is closeable by a lid, whereby a central coupling member is incorporated as abutment between the abutment plate and the lid. The coupling member may have a spherical surface so as to establish a single-point bearing for the abutment plate in the housing, and to allow freely swingable movement of the abutment plate. The trigger unit is secured in the housing via the lid, which may be designed as screw cap. Suitably, the coupling member is arranged at a central location so as to prevent interference with the rotary movement of the lid, when being threaded into position upon the housing. The coupling member can be configured in many different ways. However, a point contact with the abutment plate is preferred. Apart from a substantially spherical configuration, the coupling member may also have a conical configuration of cylindrical configuration.

According to another embodiment of the present invention, the overflow channel is subdivided in three passageways of different diameters. A first one the passageways is positioned distal to the pressure vessel and receives the guide shaft of the closure member. This passageway has a smallest diameter so that only small forces act on the rupture element which is secured to the closure member. Extending axially inwardly of the first passageway is a second, central passageway which has a greatest diameter and sealingly guides a differential piston which is loaded by a spring in the direction of the vessel and formed interiorly with a longitudinal channel. The differential piston has a sealing stub for engagement in a third one of the passageways positioned adjacent the gas pressure vessel. Thus, the differential piston is sealingly guided in the third passageway as well as in the central passageway. When the rupture element bursts, the closure member clears the upper, first passageway of the overflow channel, so that gas can escape from the central passageway of the overflow channel through the upper passageway, whereby no gas can flow through the longitudinally channeled differential piston for neutralizing the pressure drop. The differential piston is so sized that the vessel-confronting sealing stub is acted upon by a sufficiently high static and dynamic pressure to displace the differential piston in opposition to the spring force in the direction of the first passageway. In this manner, the fluid communication between the housing outlet port and the central passageway is cleared for escape of gas. As a consequence of the small diameter of the vessel distal passageway of the overflow channel, forces acting on the rupture element are independent from the cross section of the other passageways. Thus, it is possible, to use small rupture elements which are quick to respond, while at the same time realizing high flow rates at the safety device.

Suitably, the housing is transversely split into an upper housing part, which is distal to the pressure vessel, and a lower housing part, which is proximal to the pressure vessel, whereby the upper and lower housing parts are detachably securable to one another. The thermal trigger unit is thereby received in the upper housing part and the differential piston is accommodated in the lower housing part. The trigger unit is configured as separate component and may be linked with the lower housing part via a screwed connection. This configuration allows manufacturing of pre-fabricated trigger units which can easily be coupled with a wide variety of differently configured lower housing parts. This realizes a particularly efficient assembly that can be rapidly suited to customer's demands while at the same time reducing the stock.

According to another aspect of the present invention, a safety device may include a thermal trigger unit which is provided with a support member that is held in ready position by a rupture element, on the one hand, and a compression spring, on the other hand. The support member includes a stem which projects into an overflow channel for fluid communication between the vessel under gas pressure and an outlet port. When the rupture element bursts, the support member is moved into release position with the consequence that the stem pierces a membrane which forms a seal between the overflow channel and the vessel interior. In this variation of the safety device, there is no need to provide a sealing of the support member or the stem in the overflow channel. The force acting on the rupture element is independent from the inner vessel pressure so that changes in load as a result of pressure fluctuation do not adversely affect the rupture element. The membrane may also be configured as rupture element for clearing the overflow channel, when a certain inner vessel pressure is exceeded. In this manner, the safety device is compact and prevents excess pressure in case of fire.

Suitably, the stem is formed as longitudinally slotted sleeve having a slanted end face by which the membrane can be especially easily punctured. The spring force required to burst the rupture element may be reduced, so that the compression spring can be made smaller and lighter. The rupture element is thus exposed to smaller loads as well. The longitudinal slotted sleeve permits, after piercing the membrane, the escape of gas under pressure from the sleeve into the outlet port. It is, however, also feasible to use a sleeve which, instead of being longitudinally slotted, has only an opening at level with the outlet port.

According to another feature of the present invention, the compression spring may extend between a disk-like support member and a screw cap secured to the housing. The screw cap permits easy installation of the trigger unit. Support member, rupture element and compression spring may be replaced by simply removing the screw cap. The modular construction of the safety device can be best suited to a wide variety of applications. In particular, the screw cap can be used to vary the spring force exerted by the compression spring and suited to different rupture elements and membranes of different thickness.

The support member may have guide pins for guidance in the screw cap and the overflow channel. Thus, the support member can be precisely guided in piercing direction of the stem interconnected with the support member, so that the spring force, applied by the compression spring, can be employed to realize in optimum fashion a destruction of the membrane.

Suitably, the rupture element is placed in a recess located laterally next to the overflow channel in the housing.

Examples of rupture elements include a hollow body containing a filling which expands when exposed to heat. Especially suitable are glass containers which contain a liquid having a high coefficient of thermal expansion. Other fillings include foaming materials or other thermosensitive materials that ensure a bursting of the rupture element. Examples for fillings may include glycerin or gamma butyrolactone. Of course, other types of liquids or mixtures can be used as explosive liquids, without departing from the scope of the present invention.

According to another feature of the present invention, the rupture element has a bulbed configuration, and includes a spherical portion and a necking, with the necking engaging a sleeve which is formed with a circumferential contact shoulder conforming to the configuration of the spherical portion. The provision of such a contact shoulder optimized a stress distribution in the glass body and ensures the use of glass bodies of small wall thickness. Unlike glass bodies of relatively great wall thickness, glass bodies of small wall thickness can react quicker to thermal impacts, as small forces suffice to burst the glass body. Persons skilled in the art will understand that glass bodies of cross sectional configurations other than the described bulbed shape may certainly be used as well, without departing from the spirit of the present invention.

BRIEF DESCRIPTION OF THE DRAWING

The above and other objects, features and advantages of the present invention will be more readily apparent upon reading the following description of preferred exemplified embodiments of the invention with reference to the accompanying drawing, in which.

DETAILED DESCRIPTION OF PREFERRED EMBODIMENTS

Figure 1:
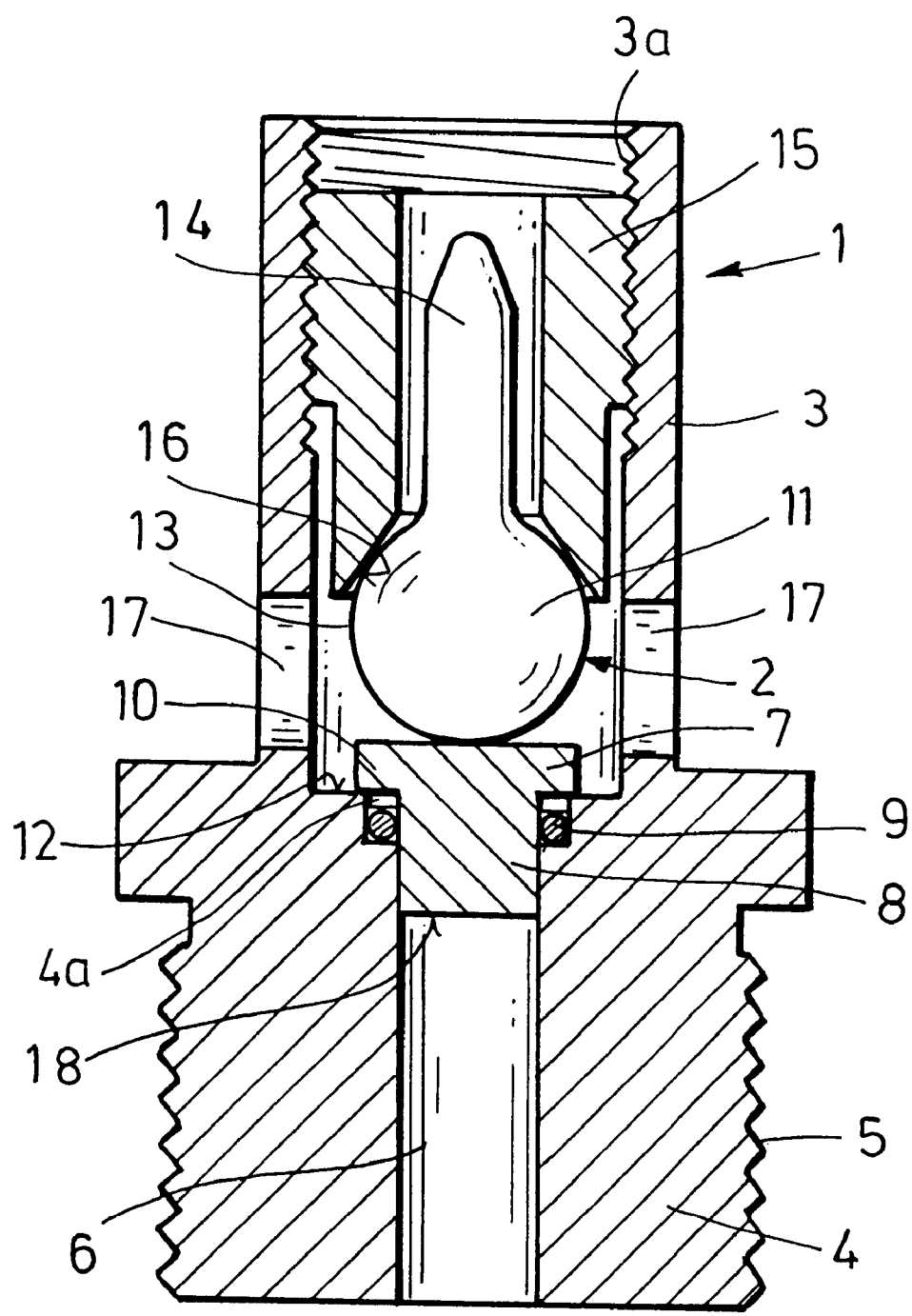
FIG. 1 is a vertical sectional view of a first embodiment of a safety device for a vessel under gas pressure in accordance with the present invention.

Throughout all the Figures, same or corresponding elements are generally indicated by same reference numerals.

Turning now to the drawing, and in particular to FIG. 1, there is shown a vertical sectional view of a first embodiment of a safety device according to the present invention, generally designated by reference numeral 17 for use with an apparatus (not shown) such as a vessel under gas or vapor pressure. The safety device 1, involved here, is especially suitable for use in road vehicles where weight considerations are of importance to limit the fuel consumption, which rises with increasing vehicle weight, and to lessen an adverse impact on the environment. The safety device 1 includes a housing 3 which accommodates a thermal trigger unit, generally designated by reference numeral 2. The housing 3 is formed integrally with a connection piece 4 having an external thread 5 for tight securement to the apparatus under pressure, for example a valve fitting or vessel under pressure. The connection piece 4 has interiorly in mid-section thereof an axial throughbore which forms an overflow channel 6. At its apparatus distal end, the overflow channel 6 is sealed by a closure member, generally designated by reference numeral 7 and having a substantial T-shaped configuration. The closure member 7 includes a guide shaft 8, which projects into the overflow channel 6, and a support plate 10 which is wider than the guide shaft 8. A sealing element 9 in the form of an O-ring is received in an anchoring groove 4a of the connecting pipe 4 to seal the guide shaft 8 in the overflow channel 6.

The thermal trigger unit 2 includes a rupture element 11 which has a bulbed configuration and includes a spherical portion 13 and a necking 14. The rupture element 11 rests against the overflow channel distal end of the support plate 10 for pushing the closure member 7 in the direction of the apparatus against a support surface 12 of the housing 3, whereby the support surface 12 circumscribes the overflow channel 6. The rupture element 11 is intended to burst at a critical ambient temperature, e.g. 110° C., and may be formed by a hollow body of glass containing an explosive liquid having a high coefficient of thermal expansion. Examples of suitable explosive liquids may include glycerin or gamma butyrolactone. Of course, other types of liquids or mixtures can be used as explosive liquids, or bursting of the rupture element 11 may occur at different critical ambient temperature, without departing from the scope of the present invention. Reference is made, for example, to U.S. Pat. No. 5,890,543.

The housing 3 is provided with an internal thread 3a for threaded engagement of a sleeve 15 which surrounds the necking 14 of the rupture element 11. The sleeve 15 has a closure member proximal end which complements a configuration of the spherical portion 13 to provide a circumferential support surface 16 that flares outwards in the form of a funnel.

FIG. 1 shows the safety device 1 in a ready position in which the rupture element 11 is pressed by the sleeve 15 against the closure member 7 which thus rests against the support surface 12 of the housing 3 via the support plate 10. The sleeve 15, the rupture element 11 and the closure member 7 are arranged in alignment with respect to the overflow channel 6. In the area of the spherical portion 13 of the rupture element 11, the housing 3 is formed transversely to the overflow channel 6 with two lateral outlet ports 17 in opposite relation.

When the ambient temperature exceeds a predetermined level, the rupture element 11 bursts, so that the interior pressure in the vessel, acting on the vessel proximal end face 18 of the guide shaft 8, pushes the closure member 7 out of the overflow channel 8 into a release position in which a fluid communication is established between the overflow channel 6 and the outlet ports 17. Thus, gas can escape from the vessel via the overflow channel 6 and the outlet ports 17.

Figure 2:
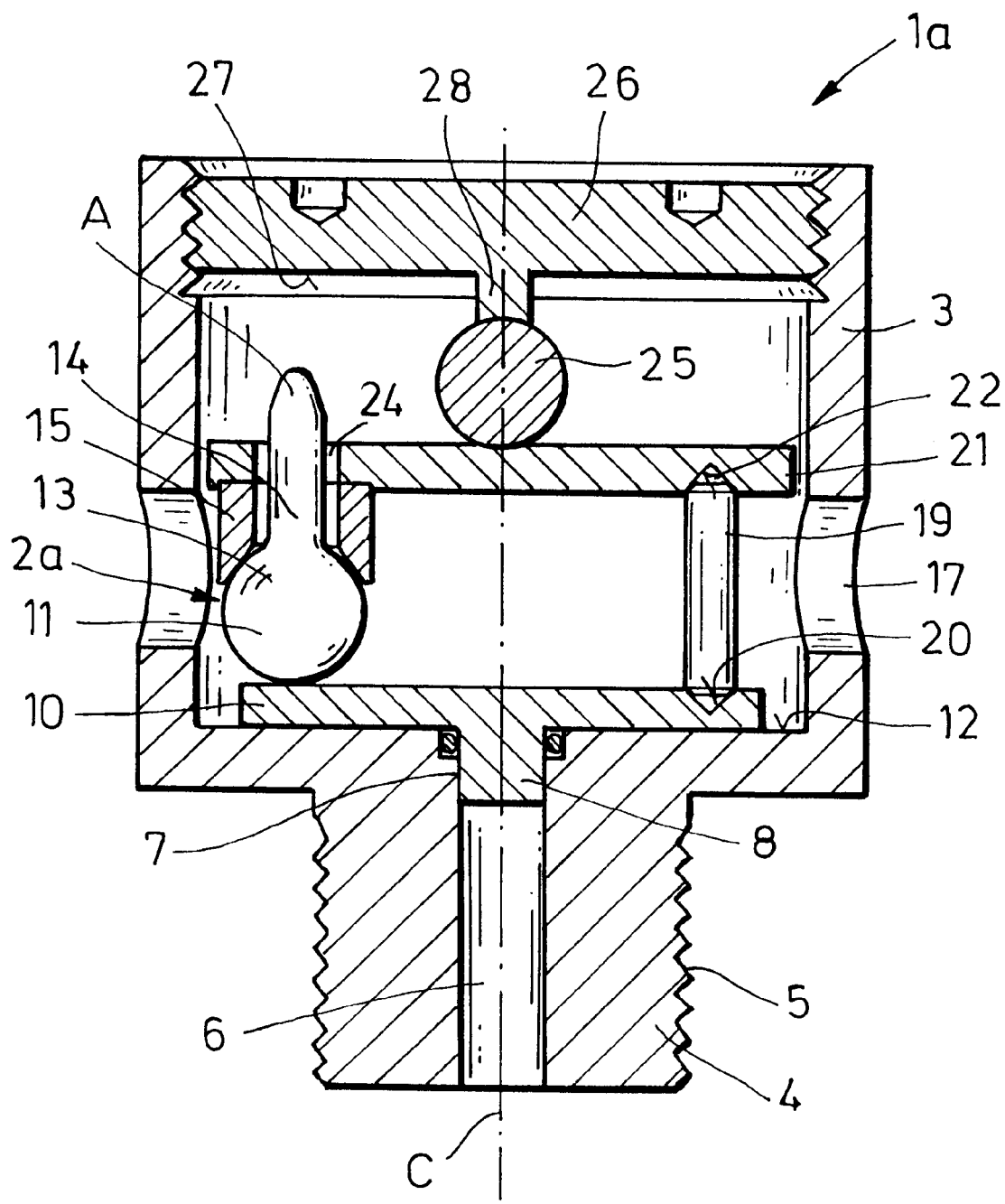
FIG. 2 is a vertical sectional view of a second embodiment of a safety device for a vessel under gas pressure in accordance with the present invention.

Turning now to FIG. 2, there is shown a vertical sectional view of a second embodiment of a safety device according to the present invention, generally designated by reference numeral 1a. Parts corresponding with those in FIG. 1 are denoted by identical reference numerals. Compared to the embodiment of FIG. 1, the housing 3 is radially extended with respect to the connection piece 4, and the support plate 10 of the closure member 7 has a radially extended diameter. Extending interiorly in the housing 3 at a distance parallel to the support plate 10 is an abutment plate 21 which is formed with a bore 24 in proximity to the perimeter of the support plate 10 for passage of the necking 14 of the rupture element 11. Also in this embodiment, the rupture element 11 is secured by the sleeve 15 which extends between the abutment plate 21 and the spherical portion 13. In opposite disposition to the rupture element 11 is a restraining element 19 which extends in parallel relation to the longitudinal center axis C of the housing 3 and has axial ends received in complementary depressions 20, 22 in the support plate 10 and the abutment plate 21, respectively. Thus, the closure member 7 is pressed, out-of-center, by the rupture element 11 via the sleeve 15, and the restraining element 19, against the support surface 12 of the housing 3, with the longitudinal axis A of the rupture element 11 extending parallel to the center axis C and thus parallel to the restraining element 19.

Supported by the abutment plate 21 at its side distal to the closure member 7 is a central coupling member 25 of spherical configuration. The coupling member 25 is held in place by a lid 26 which is threadably engaged in the top of the housing 3. The lid 26 is formed in mid-section on its side facing the coupling member 25 with a downwardly depending restraining web 28 which has an axial end complementing the configuration of the coupling member 25. Thus, the coupling member 25 is secured by the lid 26 via the restraining web 28 and urged against the abutment plate 21.

When the ambient temperature exceeds a predetermined level and the rupture element 11 bursts, the abutment plate 21 is freely movable in all directions within the housing 3 as a result of a point contact with the spherical coupling member 25, so that the closure member 7 becomes separated from the overflow channel 6 and the sealed arrangement of the guide shaft 8 in the overflow channel 6 is no longer effective. Thus, a fluid communication is established between the overflow channel 6 and the lateral outlet ports 17.

It will be appreciated by persons skilled in the art that the safety device 1a may have more than one restraining element 19. An example may include the provision of two restraining elements 19 which are placed together with the rupture element 11 in a circular arrangement at an angular distance of 120°. In this manner, when the rupture element 11 bursts upon exposure to heat, only the restraining elements 19 remain to interact with the closure member 7.

Figure 3:
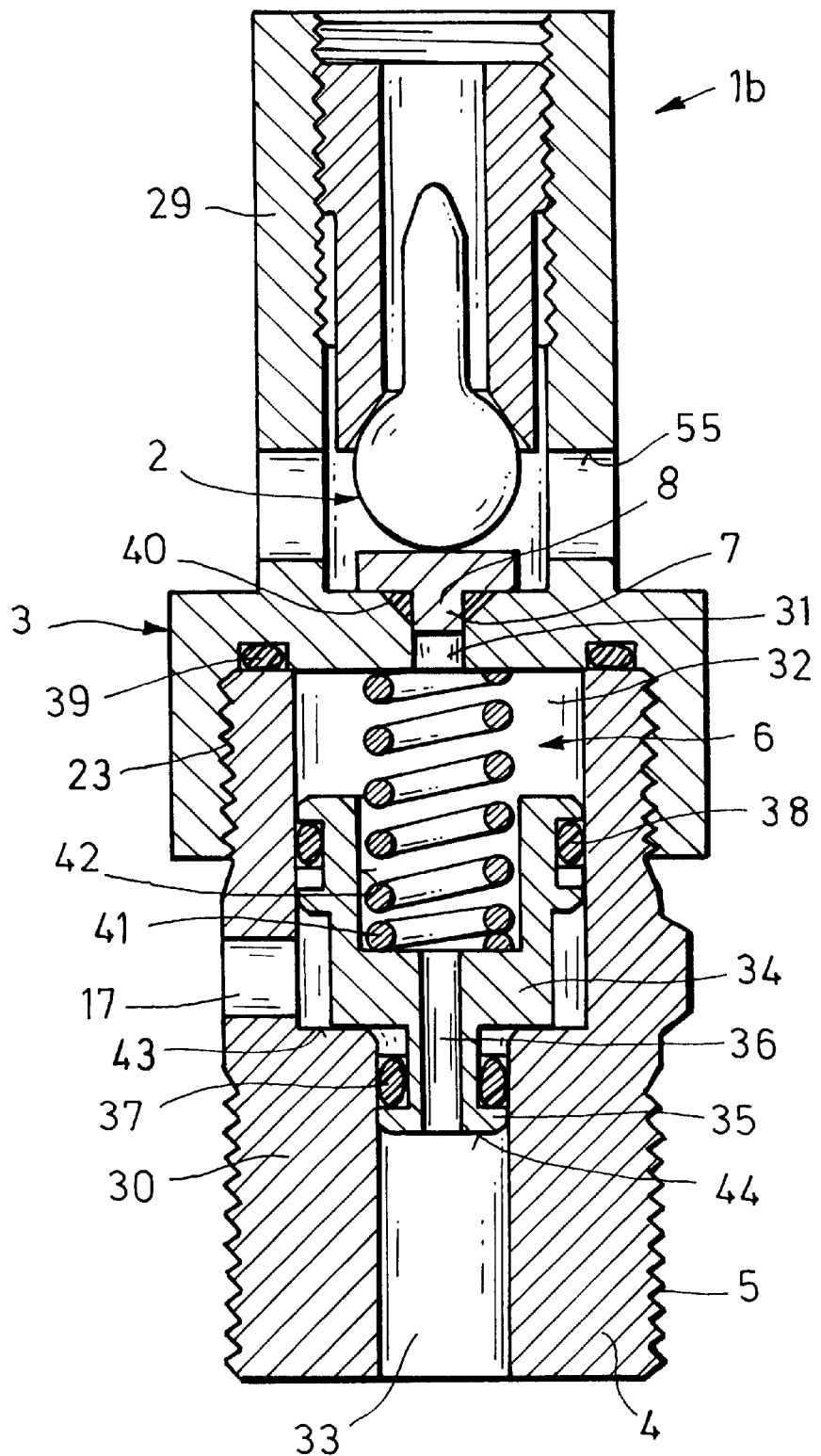
FIG. 3 is a vertical sectional view of a third embodiment of a safety device for a vessel under gas pressure in accordance with the present invention.

Referring now to FIG. 3, there is shown a vertical sectional view of a third embodiment of a safety device according to the present invention, generally designated by reference numeral 1b. Parts corresponding with those in FIG. 1 are again denoted by identical reference numerals. The housing 3 is split in an apparatus distal upper housing part 29 and an apparatus proximal lower housing part 30 which are detachably securable to one another via a threaded connection, indicated by reference numeral 23. The lower housing part 30 has formed therein the outlet port 17, which extends transversely to the overflow channel 6, and is formed integrally with the connection piece 4 for attachment of the safety device 1b to the apparatus under pressure via the thread 5. The upper housing part 29 accommodates the thermal trigger unit 2 in the form of the rupture element 11, and is formed with outlet ports 55.

In contrast to the preceding embodiments, the overflow channel 6 of the safety device 1b is subdivided in three passageways 31, 32, 33 of different diameters. The first upper passageway 31, which is proximal to the rupture element 11, has a smallest diameter and is received in the upper housing part 29 for receiving the guide shaft 8 of the closure member 7. Fluidly connected with the upper passageway 31 is the second, central passageway 32 which is formed in the lower housing part 30 and has a greatest diameter. The connection piece 4 accommodates the third lower passageway 33 which is in fluid communication with the interior of the apparatus, such as a vessel, under pressure.

Disposed in the central passageway 32 is a differential piston 34 which is sealed against the inside wall surface of the lower housing part 30 by a sealing ring 38. The differential piston 34 is extended in one piece by a sealing stub 35 which engages the third passageway 33. Sealing ring 37 forms a seal between the sealing stub 35 and the inside wall surface surrounding the sealing stub 35. The differential piston 34 is loaded by a helical compression spring 41 in the direction of the apparatus and formed with a throughbore 36 which fluidly connects the central passageway 32 with the lower passageway 33. A sealing ring 39 is incorporated between the upper and lower housing parts 29, 30 to seal the housing 3 from the outside, and a sealing ring 40 is provided to form a seal between the guide shaft 8 of the closure member 7 and the inside wall surface of the upper housing part 29, surrounding the guide shaft 8.

The compression spring 41 is received in a recess 42 of the differential piston 34 and rests against an inside surface of the differential piston 34 and a confronting inside surface of the upper housing part 29. In this way, the differential piston 34 is pressed against a radial surface 43 of the lower housing part 30 to thereby cut a fluid connection between the lower passageway 33 of the overflow channel 6 and the outlet port 17. The compression spring 41 is so dimensioned that the internal pressure of the apparatus, acting on the apparatus-proximal end face 44 of the sealing stub 35, is able to displace the differential piston 34, when the ambient temperature exceeds a critical level and the rupture element 11 bursts. As the rupture element 11 bursts, the closure member 7 is removed from the upper passageway 31 to allow gas to escape from the central passageway 32 through the outlet ports 55 and the upper housing part 29, and the differential piston 34 is lifted by the gas pressure in opposition to the spring force until a fluid communication between the third passageway 33 and the outlet port 17 is established for gas to escape.

Figure 4:
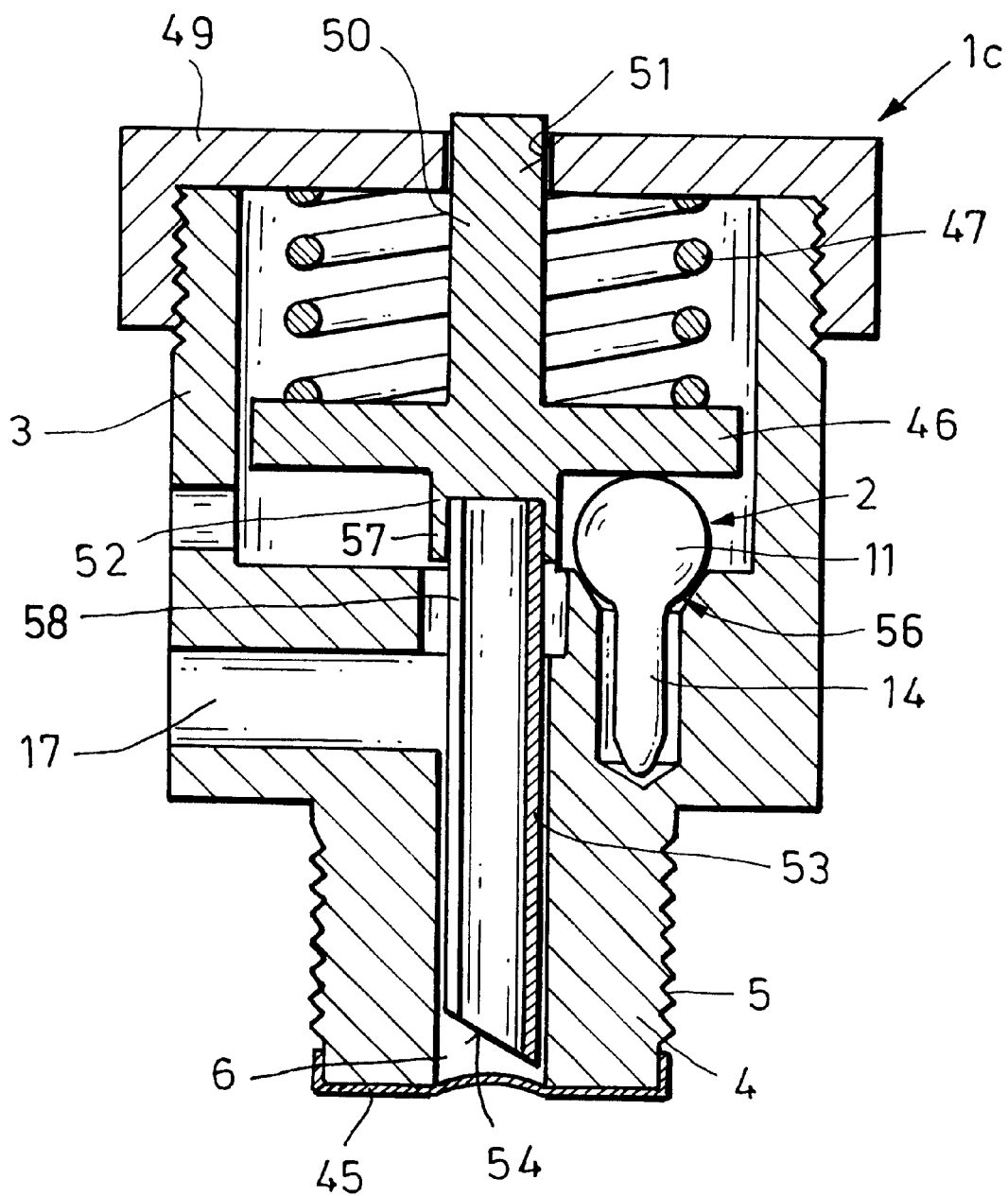
FIG. 4 is a vertical sectional view of a fourth embodiment of a safety device for a vessel under gas pressure in accordance with the present invention.

Referring now to FIG. 4, there is shown a vertical sectional view of a fourth embodiment of a safety device according to the present invention, generally designated by reference numeral 1c. Parts corresponding with those in FIG. 1 are again denoted by identical reference numerals. In this embodiment, the apparatus-proximal end of the overflow channel 6 is sealed from the apparatus by a diaphragm or membrane 45, and the thermal trigger unit 2 includes in addition to the rupture element 11 a disk-shaped support member 46. The housing 3 is formed laterally next to the overflow channel 6 with a bore 48 and a counterbore 56 for receiving the rupture element 11, whereby the necking 14 extends in the bore 48 and the spherical portion 13 is received by a complementary wall surface of the counterbore 56. The support member 46 has a generally cross-like configuration and rests upon the spherical portion 13 of the rupture element 11. A helical compression spring 47 extends between a rupture element distal side and a confronting surface of a screw cap 49 which is screwed over the respective end of the housing 3. The outlet port 17 extends in the housing 3 radially above the connection piece 4 and is fluidly connected to the overflow channel 6.

The support member 46 includes a central guide pin 50 which extends into a guide bore 51 of the screw cap 49. A second guide pin 52 projects downwards from the support member 46 in the direction of the overflow channel 6 and includes a pocket 57 for receiving a sleeve-like stem 53 which extends into the overflow channel 6 and is formed with a slot 58 in confronting relation to the outlet port 17 to thereby establish a fluid communication between the outlet port 17 and the overflow channel 6. The stem 53 has a membrane-confronting end 54 which is slanted to form a pointed end to thereby enable the stem 53 to easily pierce the membrane 45.

When the ambient temperature exceeds a critical level and the rupture element 11 bursts, the support member 46 is forced by the compression spring 47 downwards and conjointly moves the stem 53 downwards which thereby pierces with its pointed end the membrane 45. Gas in the apparatus can thus escape via the overflow channel 6 and the stem 53 to the outlet port 17.

While the invention has been illustrated and described as embodied in a safety device for an apparatus under gas pressure, such as a vessel, it is not intended to be limited to the details shown since various modifications and structural changes may be made without departing in any way from the spirit of the present invention.

What is claimed as new and desired to be protected by Letters Patent is set forth in the appended claims:

1. A safety device for an apparatus under gas pressure, comprising:

a housing having an overflow channel in fluid communication with an apparatus under pressure, and an outlet port;

a thermal trigger unit received in the housing and including a rupture element, wherein the thermal trigger unit includes a sleeve, said rupture element having a bulbed configuration and including a spherical portion and a necking, whereby the necking engages the sleeve which is formed with a circumferential contact shoulder conforming to the configuration of the spherical portion; and a closure member moveable from a ready position, in which the closure member is so acted upon by the rupture element that a guide shaft of the closure member projects into and seals the overflow channel, to a release position, in which the overflow channel is cleared for fluidly connecting the apparatus with the outlet port.

2. The safety device of claim 1 wherein the guide shaft of the closure member is sealed about its circumference against the overflow channel.

3. The safety device of claim 1 wherein the closure member has a support plate which is wider than the guide shaft and is pressed in tight contact against a housing area which surrounds the overflow channel.

4. The safety device of claim 1 wherein the rupture element is a hollow body containing filling material expanding when exposed to heat.

5. A safety device for an apparatus under pressure, comprising:

a housing having a channel in fluid communication with the interior of an apparatus under pressure, and an outlet port;

a rupture element received in the housing and destined to burst when a critical temperature level is exceeded;

a closure assembly moveable from a ready position, in which the closure assembly is so loaded by the rupture element as to seal the channel and thereby cut a fluid communication between the channel and the outlet port, to a release position, in which the channel is cleared for fluid communication with the outlet port as a result of a bursting of the rupture element; and a sleeve secured interiorly in the housing, said rupture element having a bulbed configuration and including a spherical portion and a necking, with the necking engaging the sleeve which is formed with a circumferential contact shoulder conforming to the configuration of the spherical portion for loading the rupture element against the closure member.

6. The safety device of claim 5 wherein the closure assembly includes a closure member sealingly received in the channel in the ready position and having a channel-distal surface acted upon by the rupture element.

7. The safety device of claim 6 wherein the rupture element is a hollow body containing filling material expanding when exposed to heat.

8. The safety device of claim 6 wherein the closure member is sealed about its circumference against the channel.

* * * * *